United States Patent  [11] 3,607,951

[72] Inventor Lars Andersen
 N. Hesperiagatau 7 A, Helsinki, Finland
[21] Appl. No. 704,244
[22] Filed Feb. 9, 1968
[45] Patented Sept. 21, 1971
[73] Assignee OY Medica AB
 Helsinki, Finland
[32] Priority Feb. 28, 1967
[33] Finland
[31] 586/67

[54] PROCESS FOR PREPARING 1.4-DIBROMO-2-BUTANOL
 8 Claims, No Drawings
[52] U.S. Cl..................................................... 260/633,
 260/485 H, 260/488 J
[51] Int. Cl...................................................... C07c 31/34

[50] Field of Search........................................... 260/633

[56] References Cited
 UNITED STATES PATENTS
2,124,851 7/1938 Fitzky............................ 260/633
2,838,521 6/1958 Lunsford....................... 260/326.3
3,442,957 5/1969 Durfelt.......................... 260/61 J Primary Examiner—Howard T. Mars
Attorney—Brumbaugh, Free, Graves & Donohue ABSTRACT: A process for preparing 1.4-dibromo-2-butanol from allyl bromide, including the steps of treating allyl bromide with formaldehyde in the presence of an acid catalyst and a solvent, and treating the resulting diol with hydrogen bromide to obtain the dibromobutanol product. The latter is an intermediate in the production of pyrrolidine derivatives.

PROCESS FOR PREPARING 1.4-DIBROMO-2-BUTANOL

This invention relates to a process for preparing 1.4-dibromo-2-butanol.

1.4-dibromo-2-butanol is an important intermediate in the preparation of pyrrolidine derivatives, which are used principally as the active substance in anticholinergically active medicines, such as glycopyrrolate. It has been prepared from butane-1.2.4-triol under U.S. Pat. No. 2,838,521. The synthesis with butane-1.2.4-triol is expensive, however, because of the high cost of the triol.

Other methods of preparing 1.4-dibromo-2-butanol are mentioned in the literature, but are of no practical significance because the raw materials are not produced commercially and are difficult to synthesize. In one of the methods, 4-bromo-1-butene is used as the raw material (Chemical Abstracts 47:5927e,1953). In another method, 4-methoxy-butane-1.2-diol is employed (Compt. Rend. 149, 297, 1909).

It is therefore an object of this invention to prepare 1.4-dibromo-2-butanol economically.

According to the invention, allyl bromide is reacted with formaldehyde or a formaldehyde derivative in the presence of a concentrated acid catalyst in a suitable solvent. Depending upon the solvent employed either the corresponding diol or ester is obtained, and the ester is hydrolyzed into the diol. The final product, 1.4-dibromo-2-butanol, is obtained by treating the diol with hydrogen bromide.

The synthesis may be carried out using either water or aliphatic acids as solvents. Particularly effective are the aliphatic acids having lower alkyl carbon chains, such as acetic, propionic, butyric, isobutyric acids and the like.

From an economic point of view, the most advantageous nonaqueous solvent is a mixture of acetic acid and acetic acid anhydride. In the synthesis of 1.4-dibromo-2-butanol using acetic acid and acetic acid anhydride as a solvent, the diol formed in the reaction between the allyl bromide and the formaldehyde is esterified in the course of the reaction to produce 1-bromo-2.4-diacetoxybutane. The formation of the ester in this step of the reaction is shown in the following equation:

(1)
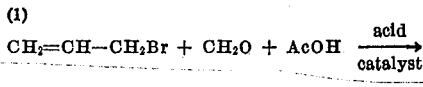

The ester formed in step 1 is hydrolyzed in an aqueous solution in the presence of hydrochloric acid to form 1-bromo-2,4-butanediol:

(2)
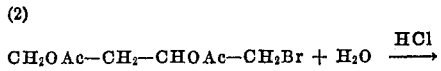

The diol formed in step 2 is converted into the final product, 1.4-dibromo-2-butanol, by treating the diol with hydrogen bromide:

3) 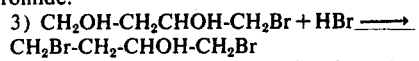

It should be understood that the above equations are only schematic. The intermediate product obtained after hydrolysis in step 2 is a mixture of many substances, one of which is 1-bromo-2.4-butanediol. When treated with hydrogen bromide, however, the mixture disintegrates and 1.4-dibromo-2-butanol is formed in satisfactory yield.

In hydrolyzing the ester, it is necessary to have a sufficiently strong, volatile acid which catalyses the hydrolysis, but can then be evaporated. Hydrochloric acid is preferred, although other suitable acids, such as hydrobromic could be employed.

As pointed out above, the synthesis may also be carried out in an aqueous solution. If water is employed as the solvent, the ester is not formed as described above in step 1. The diol, 1-bromo-2.4-dibutanediol, is formed directly from the allyl bromide, and is then converted to the product, 1.4-dibromo-2-butanol, by treatment with hydrogen bromide. This method gives a lower yield in product, but has the advantage of eliminating the hydrolysis step.

Formaldehyde polymers or acetal derivatives may be used in the synthesis, such as paraformaldehyde or formaldehydedimethylacetal. Paraformaldehyde is preferred because it is inexpensive and easy to handle.

The synthesis is carried out in the presence of an acid catalyst which may be a mineral or Lewis acid. Suitable catalysts include sulfuric acid, hydrogen bromide, hydrogen chloride, zinc chloride and boron trifluoride. It is important that the catalyst be stable enough not to be destroyed in the course of the reaction. Preferred qualities of the catalyst include nonvolatility, noncorrosiveness, and resistance to oxidation and reduction.

For practical purposes the temperature of reaction lies within the temperature range of approximately 80° C. to 110° C. Below 80° C. the reaction time is at least one week. At 110° C. the highly volatile allyl bromide may evaporate, although the reaction time is considerably shorter. Evaporation may be prevented by using an autoclave; however, the reaction compound is extremely corrosive and other complications arise, such as above 130° C. decomposition is likely to occur.

The preferred method is to heat the reaction mixture on a steam bath under reflux for a period of approximately 15–20 hours, during which time the temperature rises from 80° C. to 100° C. in 2–3 hours, after the allyl bromide has been consumed.

In converting the diol into the product with gaseous hydrogen bromide, the free and bound primary alcohol groups are converted into bromide without the secondary alcohol groups being affected. The conversion is achieved by treating the diol with hydrogen bromide at a temperature of approximately 140° C.–150° C. for a period of approximately 2–6 hours.

The following examples illustrate the process of the invention, but should not be construed as limiting in any way the scope of the invention:

EXAMPLE 1

A mixture of 150 g. allyl bromide, 200 ml. acetic acid, 75 g. paraformaldehyde, 75 ml. acetic acid anhydride and 20 ml. concentrated sulfuric acid is formed and heated on a steam bath under reflux for 15–20 hours. The product is poured, with stirring, into 1.5 liter of cold water. The heavy oil layer is removed and the water layer extracted with methylene chloride. The organic phases are combined, dried with magnesium sulfate, and evaporated on a steam bath. The residue is a brown oil, weighing about 200 g. The oil is hydrolyzed by boiling under reflux for 2 hours with 500 ml. of 3 N hydrochloric acid, and the solution is treated with activated carbon and evaporated in a vacuum on a steam bath. The product obtained weights 130–150 g. The substance is converted into 1.4-dibromo-2-butanol by treatment with gaseous hydrogen bromide for 4–5 hours at 140°–150° C. The reaction is completed when the reaction compound no longer consumes any hydrogen bromide. The raw product is distilled in a vacuum. 1.4-dibromo-2-butanol boils at 112°–118° C./12 milligrams of mercury, and the yield is about 100 g.

EXAMPLE 2

A mixture of 150 g. allyl bromide, 200 ml. acetic acid, 75 g. paraformaldehyde, 75 ml. acetic acid anhydride and 75 ml. boron trifluoride ether complex is treated as in Example 1. The yield of 1.4-dibromo-2-butanol is 60–70 g.

EXAMPLE 3

A mixture of 150 g. allyl bromide, 200 ml. acetic acid, 100 ml. acetic acid anhydride, 25 ml. concentrated sulfuric acid and 100 ml. formaldehydedimethylacetal is treated as in Example 1. The yield of 1.4-dibromo-2-butanol is about 40 g.

EXAMPLE 4

A mixture of 150 g. allyl bromide, 250 ml. acetic acid, 75 ml. acetic acid anhydride, 75 g. paraformaldehyde and 75 g. zinc chloride is treated as in Example 1. The yield of 1.4-dibromo-2-butanol is about 80 g.

EXAMPLE 5

A mixture of 150 g. allyl bromide, 75 g. paraformaldehyde and 150 ml. of 48 percent hydrobromic acid is heated under reflux on a steam bath for 20 hours. A 300 ml. portion of water is added, the oil layer is removed, and the water layer extracted with methylene chloride. The yield after evaporation is about 150 g. The substance is treated with gaseous hydrogen bromide as in Example 1 to yield 25 g. of 1.4-dibromo-2-butanol.

I claim:

1. A process for preparing 1.4-dibromo-2-butanol comprising the steps of contacting allyl bromide with formaldehyde or formaldehydedimethylacetal in the presence of a mineral or Lewis acid catalyst in a lower alkanoic acid solvent, at a temperature of from at least about 80° C. to about 130° C. to form a reaction product comprising an ester of 1-bromo-2.4-butanediol, hydrolizing the resulting ester in the presence of a strong acid selected from the group consisting of hydrochloric and hydrobromic acid to form 1-bromo-2.4-butanediol, contacting the diol with hydrogen bromide at a temperature of from about 140° C. to about 150° C. and thereafter distilling the solution to recover 1.4-dibromo-2-butanol.

2. A process as set forth in claim 1, wherein the formaldehyde is paraformaldehyde.

3. A process as set forth in claim 1, wherein the acid catalyst is selected from the group of sulfuric acid, zinc chloride and boron trifluoride.

4. A process as set forth in claim 1, wherein the lower alkanoic acid solvent is acetic acid.

5. A process as set forth in claim 10, wherein the solvent is a mixture of acetic acid and acetic acid anhydride.

6. A process for preparing 1.4-dibromo-2-butanol, comprising the steps of contacting allyl bromide with formaldehyde or formaldehydedimethylacetal in the presence of a mineral or Lewis acid catalyst in a water solvent at a temperature of from at least about 80° C. to about 130° C. to from a reaction product of 1-bromo-2.4-butanediol, contacting the diol with hydrogen bromide at a temperature of from about 140° C. to about 150° C. and thereafter distilling the solution to recover 1.4-dibromo-2-butanol.

7. A process as set forth in claim 6, wherein the formaldehyde is paraformaldehyde.

8. A process as set forth in claim 6, wherein the acid catalyst is selected from the group of sulfuric acid, zinc chloride and boron trifluoride.

UNITED STATES PATENT OFFICE
CERTIFICATE OF CORRECTION

Patent No. 3,607,951  Dated 9/21/71

Inventor(s) Lars Andersen

It is certified that error appears in the above-identified patent and that said Letters Patent are hereby corrected as shown below:

Inventor's address: "N. Hesperiagatau" should be:
-- N. Hesperiagatan --;

Col. 1, line 45, formula "$CH_2=CH-CH_2Br + CH_2O + AcOH \xrightarrow{\text{acid catalyst}}$" should be:

$$CH_2=CH-CH_2Br + CH_2O + AcOH \xrightarrow{\text{acid catalyst}}$$
$$CH_2OAc-CH_2-CHOAc-CH_2Br$$

Col. 1, line 60, formula "$CH_2OAc-CH_2-CHOAc-CH_2Br + H_2O \xrightarrow{HCl}$" should be:

$$CH_2OAc-CH_2-CHOAc-CH_2Br + H_2O \xrightarrow{HCl}$$
$$CH_2OH-CH_2-CHOH-CH_2Br$$

Col. 4, claim 5, "A process as set forth in claim 10" should be:
-- A process as set forth in claim 1 --.

Signed and sealed this 9th day of May 1972.

(SEAL)
Attest:

EDWARD M. FLETCHER, JR.
Attesting Officer

ROBERT GOTTSCHALK
Commissioner of Patents